April 5, 1966  A. C. NEWMAN  3,243,912
FISH LURE
Filed July 6, 1964  2 Sheets-Sheet 1
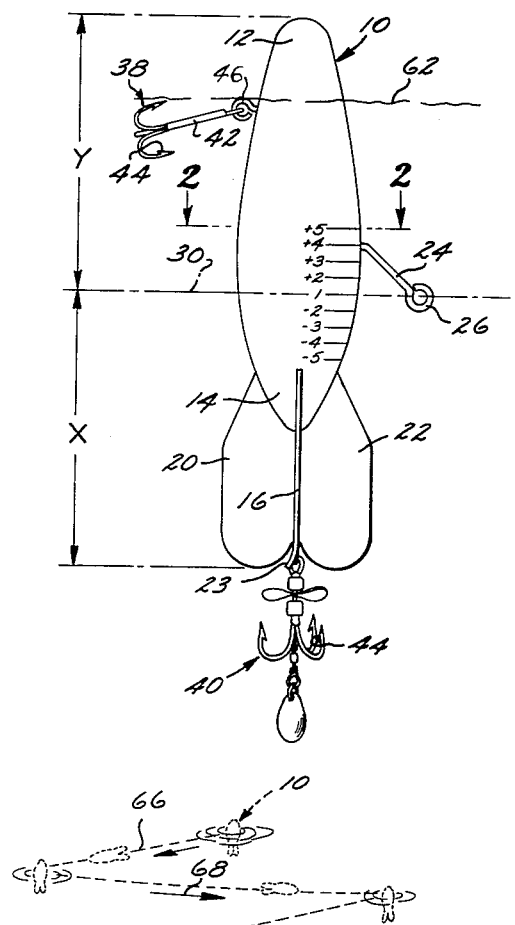
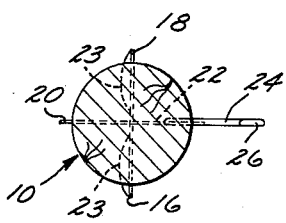
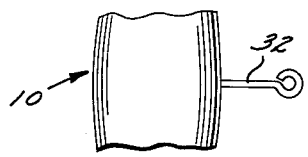
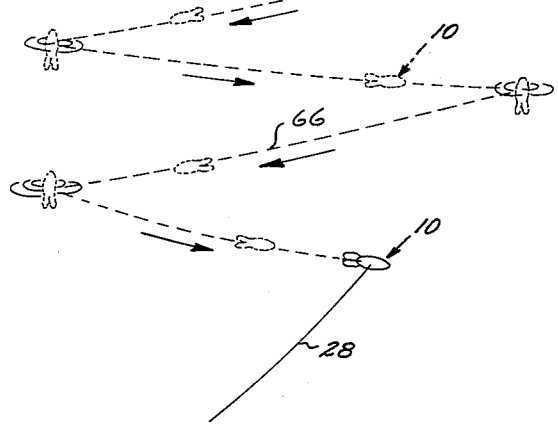
INVENTOR.
ALBERT C. NEWMAN
BY Fulwider, Patton, Rieber,
Lee and Utecht
ATTORNEYS April 5, 1966     A. C. NEWMAN     3,243,912

FISH LURE

Filed July 6, 1964     2 Sheets-Sheet 2

INVENTOR.
ALBERT C. NEWMAN
BY Fulwider, Patton, Rieber, Lee and Utecht
ATTORNEYS

United States Patent Office 3,243,912
Patented Apr. 5, 1966

3,243,912
FISH LURE
Albert C. Newman, 272½ Euclid, Long Beach, Calif.
Filed July 6, 1964, Ser. No. 380,435
9 Claims. (Cl. 43—42.16)

This application is a continuation-in-part of my copending application entitled Fish Lure, Serial No. 136,022, filed Sept. 5, 1961, now U.S. Patent 3,139,693, issued July 7, 1964.

This invention relates generally to fish lures but more particularly to lures characterized by a zigzag path upon movement through the water.

A popular style of fishing is bait casting in which an artificial lure is cast by the fisherman and retrieved by reeling in the line to which the lure is attached, the lure offering an attraction to fish as it passes.

The lures of the prior art are retrieved along a substantially straight line from the point to which the lure is cast to the position of the fisherman, and the attraction offered by the lure is therefore necessarily limited to its appearance or erratic motion, such as wiggling or the like. Moreover, since such lures are retrieved along a generally straight line, the area covered or exposed to the lure during each cast is substantially restricted.

It is an object of this invention to provide a fish lure which is so constructed as to cover a relatively large area during each retrieval operation. This is accomplished by providing an elongated lure body which has a weight distribution causing it to float with its longitudinal axis substantially vertically oriented. The retrieving line is attached to the lure so that the lure tends to initially be pulled broadside through the water toward the fisherman pulling on the retrieving line. This initial broadside movement is resisted by the whole length of the lure, and consequently it travels upwardly out of the water along the path of least water resistance. The lure rises up from the surface of the water so that its center of gravity is then located over its center of buoyancy, and the lure is unstable. It will not tip toward or away from the fisherman since the point of attachment of the retrieving line is such that the lure tends to be pulled broadside, but there is nothing to restrain it from lateral tipping. Consequently, any slight movement of the retrieving line or imbalance in the water resistance forces against the lure will cause it to tip laterally one way or the other, it being noted that skilled manipulation of the retrieving line can easily control the direction of tipping. Once tipped, the lure acts like a kite, and will resist broadside pulling through the water and instead travel along the path of least water resistance, that is, along a lateral path with the longitudinal axis of the lure substantially coincident with the lateral path.

The motion of the lure through the water aligns the longitudinal axis of the body with its path of movement, and when the retrieving line is slackened, thereby slowing or halting the longitudinal movement of the lure through the water, the lure will assume a vertical position. Since the lure has just traveled in a lateral path in one lateral direction, a pull on the retrieving line now will have the effect of moving the lure upwardly out of the water and tilting it in the opposite lateral direction for travel along a new lateral path. The new direction of tilting is theorized as resulting from the angle of the line and manipulation of the line to pull the lure just as it bobs in the desired direction.

Thus, another object of the present invention is to provide a fish lure which can be caused to move in a zigzag direction during retrieval. The fisherman can cause the lure to move in a zigzag path, with the lengths of the zigs and zags being determined by the intervals between slackening of the retrieving line by the fisherman to put the lure in an upright position.

Therefore, another object is to provide a fish lure whose path of return movement upon retrieval can be directed laterally of the axis of the retrieving line in a zigzag path, with the duration of travel along any particular path being controllable by slackening the pull on the retrieving line to orient the lure in an upright position.

A further object of the invention is to provide a fish lure of the aforementioned character and mounting a spinner-hook arrangement at the rearward end portion thereof to attract fish and slow the speed of travel of the lure through the water.

Another object of this invention is to provide a fish lure which is simple and easy to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a side elevational view of a fish lure according to the present invention;

FIG. 2 is a view taken along the line 2—2 of FIG. 1;

FIG. 3 is a partial side elevational view of another embodiment of the present fish lure;

FIG. 4 is a partial side elevational view of still another embodiment of the present fish lure;

FIG. 5 is a view taken along the line 5—5 of FIG. 4;

FIG. 6 is a diagram of a typical path followed by the lures of the present invention during retrieval;

Like reference numerals indicate corresponding parts throughout the several views of the drawing.

Figure 7:
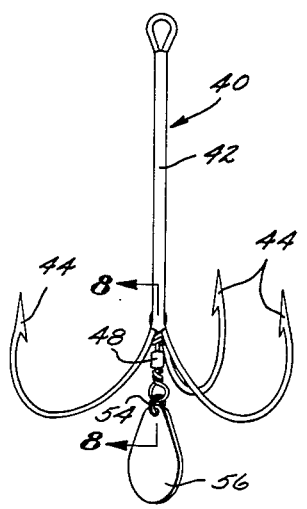
FIG. 7 is an enlarged elevational view of a spinner-hook arrangement adapted for securement to the various lures of the present invention.

Referring to the drawings, the embodiment chosen for illustration of the present invention comprises an elongated, buoyant body 10 which may be formed of wood or plastic materials or the like, as desired. The body 10 can be made buoyant in water through use of a material having a density less than that of water, or the body can be formed with a hollow interior, as will be apparent.

The body 10 is characterized by a circular cross section and is provided with a tapered leading or forward end portion 12 and a tapered trailing or rearward end portion 14 to which is fastened four rearwardly projecting, diametrically opposed guide fins 16, 18, 20, and 22. The fins may be formed of any suitable material such as sheet steel, plastic or the like. The fins 16 and 18 are disposed perpendicular to the fins 20 and 22 and include bent lower tips, as indicated at 23, which curve away from the side of the body to which the retrieving line is secured, as will be seen.

The retrieving line attachment means is constituted by an ordinary eye screw or eye bolt having an elongated shank 24 threadedly mounted at one end to the body 10 between the end portions 12 and 14 at substantially the mid portion of the body. The opposite end of the shank 24 includes an eyelet 26 defining an opening which is the point of attachment for a retrieving line 28, as shown generally in FIG. 6. The eyelet opening is preferably located above the center of gravity of the complete fish lure and lies in a transverse plane generally indicated at 30. In addition, the longitudinal axis of the shank 24 preferably extends rearwardly at an angle to the longitudinal axis of the body 10, although an alternative arrangement, as shown in FIG. 3, has also been found to operate satisfactorily, the alternative eye bolt having a shank 32 disposed normal or perpendicular to the longitudinal axis of the body 10. Each of these arrangements produces its own characteristic operation of the lure, as will be seen.

A third form of retrieving line attaching means is illustrated in FIGS. 4 and 5, being constituted by a wire loop or bridle 34 which is fastened by screws 35 to opposite sides of the body 10 at points longitudinally aligned with the fins 16 and 18. The loop or slack portion of the bridle 34 projects laterally of the body 10 and is formed at its middle into an apex 36 to which the retrieving line 28 is fixed. In each of the three forms of retrieving line attaching means described it will be noted that the point of line attachment is located between the body end portions 12 and 14, and the points of attachment of such means to the body 10 lie in a plane disposed transversely of the longitudinal axis of the body 10. This is in contrast to the longitudinally spaced attachment points characterizing the fish lure disclosed in my above-identified United States Patent No. 3,139,693.

Figure 8:
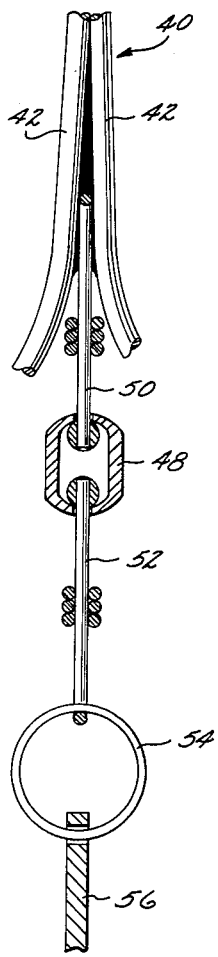
FIG. 8 is an enlarged view taken along the line 8—8 of FIG. 7.

The present fish lure also includes a pair of fish hooks 38 and 40, each characterized by an elongated shank 42 and treble barbs 44 forming continuations of the shank 42 and radiating outwardly to present hooking means in three different directions. The hook 38 is mounted to an eye bolt 46 which is threaded into the body 10 adjacent the forward end portion 12 thereof. The hook 40 is similarly mounted to an eye bolt (not shown) which is brazed or otherwise secured to the lower ends of the fins 16, 18, 20 and 22 at their points of intersection at the longitudinal axis of the body 10. In addition, as best seen in FIGS. 7 and 8, a conventional swivel 48 is connected to the lower end of the shank 42 of the hook 40 by a wire 50 constituting one rotatable portion of the swivel. The other rotatable portion of the swivel is a wire 52 which mounts a ring 54 carrying a spinner constituted by a dish-shaped spoon 56 having a polished, light-reflective surface. As will be apparent, as the fish lure travels through the water the spoon 56 will rotate about the longitudinal axis of the body 10, attracting fish and tending to slow the rate of travel of the body.

Figure 9:
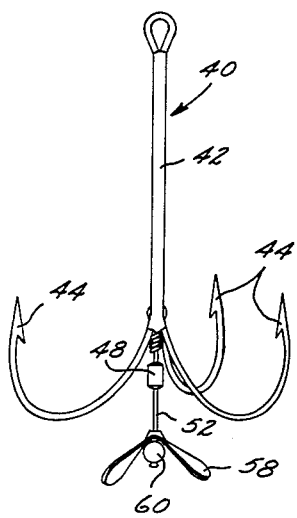
FIG. 9 is an enlarged sectional view of another form of spinner-hook arrangement.

In FIG. 9 there is ilustrated another form of spinner for the hook 40, the spinner in this case being constituted by a two-bladed screw 58 rotatable about the wire 52 and retained in position by a ball 60 swaged to the free end of the wire 52. FIG. 1 shows a spoon 56-screw 58 combination.

The fish lure is characterized by a weight distribution such that it normally floats in water with its longitudinal axis in a substantially vertical position relative to the water line, which water line is indicated generally at 62 in FIG. 1, and the forward end portion 12 projects above such water line, as illustrated.

The retrieving line 28 is attached to the line attachment means of the lure, such as, for example, to the eyelet 26 of the embodiment of FIG. 1, and the lure weight distribution and the location of the eyelet affect the direction of travel of the lure when the line 28 is pulled. More particularly, as best viewed in FIG. 6, the lure is first cast by the fisherman and allowed to come to rest for a few seconds. This is commensurate with good fishing practice in that it is generally desirable to allow the lure to remain idle for a short period of time to allow the general disturbance caused by the lure hitting the water to subside.

By allowing the lure to come to rest, it will assume the position shown generally in FIG. 1 of the drawings, with the fins thereof positioned downwardly. However, since the body 10 of the lure is buoyant the forward end portion 12 will remain exposed above the surface of the water, as previously indicated.

The purpose of the vertical disposition of the lure is to promote an unstable condition when the line 28 is retrieved. That is, a pull on the line 28 causes the fish lure to move upwardly out of the water. The upward movement of the lure is a result of the particular location of the attachment means or eyelet 26 at the mid portion of the lure. This converts the pulling on the fisherman's retrieving line into a substantially broadside movement of the lure through the water in a direction which is initially along the axis of the taut retrieving line. This broadside movement is only an initial tendency and is not particularly noticeable in actual operation since the broadside movement is almost instantaneously converted into an upward movement of the lure. That is, since the lure is normally vertically disposed in the water, the broadside pull is resisted by the whole longitudinal cross sectional area of the lure, and the lure consequently tends to move in a path of lesser resistance. This path of lesser resistance is upwardly, in which direction the water resistance is much less because only the transverse cross section of the lure opposes such upward movement. The action is analogous to that of an ordinary kite which often becomes unstable and tips to one side or the other, laterally away from the axis of the kite string. Subsequent to such tipping, the kite veers along the tipped path until the aerodynamic forces on it promote a stable condition of the kite, in which it again assumes a normally vertical position.

The operation of the present fish lure is much the same, except that the fish lure, subsequent to its rising upwardly from the water and tipping, follows a lateral path, as at 66 in FIG. 6, substantially along the plane of the water.

The speed of the lure along its lateral path is controlled primarily by the speed with which the retrieving line is pulled in, although the spoon 56 and screw 58 also affect the speed of the lure. The resistance of the water hydrodynamically aligns the fish lure so that it travels in a path substantially coincident with its longitudinal axis. However, immediately subsequent to slackening of the retrieving line, the longitudinal motion of the lure ceases, and the lure then assumes the previously described upright position because of its weighted nature.

By proper manipulation of the retrieving line, the lure can be caught as it bobs in the desired direction so that a renewed pull on the line will dictate a new direction of lateral tipping of the lure subsequent to its movement upwardly away from the water, and the lure will then travel along a different path 68. The process is repeated as desired to provide a zigzag path.

The character of the lure during its zigzag return travel is affected by slight changes in the location and disposition of the retrieving line attachment means and also by the fins 16, 18, 20, and 22. More particularly, the bent tips 23 on the guide fins 16 and 18 tend to widen the angle of travel of the lure by directing the lure in a more nearly lateral direction relative to the fisherman.

As best illustrated in FIG. 1 by the indicia 68, which have been applied to the drawing purely to facilitate the present description, the eyelet 26 to which the line 28 is attachable is preferably located in the transverse plane 30. This is shown in drawing at "1" and it is located approximately midway between the opposite ends of the lure. The "X" and "Y" dimensions shown are substantially equal. Although the plane "1" thus appears to be the dimensional midpoint of the lure, it is also very close to being a division of the lure into portions having approximately the same resistance to broadside travel of the lure through the water. In addition, the plane "1" preferably lies just above the transverse plane which includes the center of gravity of the lure, including the hooks and all other operative components. The inclination of the shank 24 also gives optimum performance.

In departing from this optimum positionment, it has been found that as the location of the eyelet 26 is moved upwardly toward "+5" plane, the lure tends to return in a straighter path to the fisherman, and as the location moves toward the "—5" plane the speed of retrieval must be slowed or the lure "bucks" in the water, and the reversals of path direction are not smooth.

The eyelet gives a wider angle of lateral travel and a better tipping action of the lure for reversals of path direction when the inclined shank 24 is used rather than the perpendicular shank 32. In addition, the eyelet is preferably spaced from the body 10, as illustrated, for better lure tipping on retrieval, but the eyelet could be made flush with the body if a certain sluggishness of action can be tolerated.

It is contemplated within the scope of this invention that a fish lure incorporating these teachings may be a surface lure or a subsurface lure as desired.

The present invention affords a highly maneuverable fish lure having many advantages. For instance, with the present lure it is possible to cast the lure over an obstacle such as a weed bed or exposed log, and thereafter cause it to be retrieved around such an obstacle. Also, it is possible to direct the lure to a particular location where it is believed fish are located. That is, since it is well known that fish frequently feed near weed beds and shore lines, it is possible to "work" or move the lure to these particular locations without the risk of snagging the lure on logs, weeds or the like.

It is thus seen that the present invention provides a fish lure which can be readily controlled as to its direction of movement through the water.

Although I have shown and described certain specific embodiments of my invention, I am fully aware that many modifications thereof are possible. The invention itself therefore is not to be restricted except insofar as is necessitated by the prior art and by the spirit of the appended claims.

I claim:
1. A fish lure comprising:
an elongated, bouyant body having a weight distribution causing said body to normally float in water with its longitudinal axis in a substantially vertical position, said bouyant body having a forward end portion and a rearward end portion;
and means supported by and projecting laterally from said body to provide a portion in spaced relation to said body for connection to a retrieving line, said portion and all points at which said means are supported by said body lying in a plane disposed transversely of the longitudinal axis of said body, said portion also being located adjacent the middle of said body, whereby a pull on said line transmits a force to said body tending to keep said longitudinal axis in a plane substantially perpendicular to said line and tending initially to move the vertically disposed said body broadside through the water along the axis of said line and thence upwardly from the water to a point of instability effecting lateral tipping of said body in a direction away from the axis of said line, continued pulling on said line tending to urge said body along a path approximately coincident with the longitudinal axis of said body and laterally away from said axis of said line.

2. A fish lure as set forth in claim 1 wherein two guide fins are disposed on opposite sides of said body and face said retrieving line, and the rearward tips of said fins are curved in a direction away from said point of attachment of said line and said means.

3. A fish lure as set forth in claim 1 wherein said means comprises a bridle element attached to said body on opposite sides thereof and lying on opposite sides of said axis of said line, and said line is attached to the middle of said bridle element.

4. A fish lure as set forth in claim 1 wherein said means comprises an element secured to said body and defining an opening for attachably receiving said retrieving line.

5. A fish lure as set forth in claim 1 wherein said means comprises an element secured to said body and defining an opening spaced from said body and adapted for attachably receiving said retrieving line.

6. A fish lure comprising:
an elongated, buoyant body having a weight distribution causing said body to normally float in water with its longitudinal axis in a substantially vertical position, said buoyant body having a forward end portion and a rearward end portion;
and an element having an elongated shank secured at one end to said body and including means at its opposite end adapted for attachably receiving a retrieving line at a point approximately midway between said forward and rearward end portions whereby a pull on said line transmits a force to said body tending to keep said longitudinal axis in a plane substantially perpendicular to said line and tending initially to move the vertically disposed said body broadside through the water along the axis of said line and thence upwardly from the water to a point of instability effecting lateral tipping of said body in a direction away from the axis of said line, continued pulling on said line tending to urge said body along a path approximately coincident with the longitudinal axis of said body and laterally away from said axis of said line.

7. A fish lure as set forth in claim 6 wherein the axis of said shank is substantially perpendicular to the longitudinal axis of said body.

8. A fish lure as set forth in claim 6 wherein the axis of said shank is inclined relative to the longitudinal axis of said body whereby said eyelet is projected in the direction of said rearward end portion of said body.

9. A fish lure comprising:
an elongated, bouyant body having a weight distribution causing said body to normally float in water with its longitudinal axis in a substantially vertical position, said buoyant body having a forward end portion and a rearward end portion;
means supported by and projecting laterally from said body to provide a portion in spaced relation to said body for connection to a retrieving line, said portion and all points at which said means are supported by said body lying in a plane disposed transversely of the longitudinal axis of said body, said portion also being located adjacent the middle of said body, whereby a pull on said line transmits a force to said body tending to keep said longitudinal axis in a plane substantially perpendicular to said line and tending initially to move the vertically disposed said body broadside through the water along the axis of said line and thence upwardly from the water to a point of instability effecting lateral tipping of said body in a direction away from the axis of said line, continued pulling on said line tending to urge said body along a path approximately coincident with the longitudinal axis of said body and laterally away from said axis of said line;
guide fins attached to said rearward end portion of said body;
hook means including an elongated shank having a longitudinal axis coincident with the longitudinal axis of said body and secured at one end to said guide fins;
a swivel secured to the opposite end of said shank;
and a spinner carried by said swivel for rotation about an axis substantially coincident with the longitudinal axis of said body and imparting a drag to slow the speed of said body through the water.

(References on following page)

References Cited by the Examiner

UNITED STATES PATENTS

| | | | |
|---|---|---|---|
| 841,429 | 1/1907 | Passage | 43—42.31 |
| 1,242,556 | 10/1917 | Jay | 43—42.23 |
| 1,406,834 | 2/1922 | Fisher | 43—42.14 |
| 1,487,556 | 3/1924 | Goble | 43—42.47 X |
| 2,155,294 | 4/1939 | Barnett | 43—42.47 X |
| 2,199,001 | 4/1940 | Khoenle | 43—42.2 X |
| 2,262,974 | 11/1941 | Steiner | 43—42.31 X |
| 2,703,947 | 3/1955 | Petrasek et al. | 43—42.39 |
| 2,775,840 | 1/1957 | Dumas | 43—42.16 |
| 2,787,860 | 4/1957 | Carr | 43—42.39 |
| 2,977,708 | 4/1961 | Mills | 43—42.16 |
| 3,139,693 | 7/1964 | Newman | 43—42.39 |

SAMUEL KOREN, *Primary Examiner.*

ABRAHAM G. STONE, *Examiner.*